United States Patent
Fux et al.

(10) Patent No.: US 8,588,826 B2
(45) Date of Patent: Nov. 19, 2013

(54) METHOD OF RESPONDING TO AN INCOMING COMMUNICATION RECEIVED BY A HANDHELD DEVICE

(71) Applicant: Research In Motion Limited, Waterloo (CA)

(72) Inventors: Vadim Fux, Waterloo (CA); Denis Fedotenko, Waterloo (CA)

(73) Assignee: Blackberry Limited, Waterloo, ON (CA)

( * ) Notice: Subject to any disclaimer, the term of this patent is extended or adjusted under 35 U.S.C. 154(b) by 0 days.

(21) Appl. No.: 13/729,511

(22) Filed: Dec. 28, 2012

(65) Prior Publication Data

US 2013/0115926 A1   May 9, 2013

Related U.S. Application Data

(63) Continuation of application No. 11/460,388, filed on Jul. 27, 2006, now Pat. No. 8,369,843.

(51) Int. Cl.
*H04W 4/00* (2009.01)

(52) U.S. Cl.
USPC ........ 455/466; 455/445; 455/412.1; 455/413; 455/417; 379/88.11; 379/52; 379/88.01; 379/88.26; 379/67.1; 370/230; 370/310

(58) Field of Classification Search
USPC .............. 455/445, 466, 412.1, 413, 415, 417, 455/414.1; 379/88.11, 52, 88.01, 88.26, 379/88.08, 88.14, 67.1; 370/230, 310
See application file for complete search history.

(56) References Cited

U.S. PATENT DOCUMENTS

| | | | | | |
|---|---|---|---|---|---|
| 5,559,860 | A | * | 9/1996 | Mizikovsky | 455/413 |
| 6,044,134 | A | * | 3/2000 | De La Huerga | 379/88.08 |
| 6,816,577 | B2 | * | 11/2004 | Logan | 379/67.1 |
| 7,010,288 | B2 | * | 3/2006 | Brown et al. | 455/412.1 |
| 7,116,976 | B2 | * | 10/2006 | Thomas et al. | 455/417 |
| 7,305,068 | B2 | * | 12/2007 | Tucker et al. | 379/88.11 |
| 2002/0067808 | A1 | * | 6/2002 | Agraharam et al. | 379/88.14 |
| 2002/0181671 | A1 | * | 12/2002 | Logan | 379/88.13 |
| 2003/0228002 | A1 | * | 12/2003 | Tucker et al. | 379/88.01 |
| 2005/0058067 | A1 | * | 3/2005 | Chmaytelli et al. | 370/230 |
| 2005/0107093 | A1 | * | 5/2005 | Dowling | 455/456.4 |
| 2005/0124324 | A1 | * | 6/2005 | Thomas et al. | 455/412.1 |

OTHER PUBLICATIONS

U.S. Appl. No. 11/460,388, filed Jul. 27, 2007 now Patent No. 8,369,843 Title: Method of Responding to an Incoming Communication Received by a Handheld Device.

* cited by examiner

*Primary Examiner* — April G Gonzales
(74) *Attorney, Agent, or Firm* — Perry + Currier

(57) ABSTRACT

A method for replying to an incoming communication received by a handheld electronic device comprises detecting: an incoming communication, detecting a selection of one of a number of predetermined responses to the incoming communication and, responsive to detecting a selection, providing the one of said number of predetermined responses. An improved handheld electronic device implementing the method is also provided.

12 Claims, 2 Drawing Sheets

METHOD OF RESPONDING TO AN INCOMING COMMUNICATION RECEIVED BY A HANDHELD DEVICE

BACKGROUND

1. Field

The disclosure relates generally to handheld electronic devices and, more particularly, to a method for responding to an incoming communication received by a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Although some handheld electronic devices are stand-alone devices, many feature wireless communication capability for communication with other devices.

Such handheld electronic devices are generally intended to be portable. Many handheld electronic devices are small enough to fit within, for example, a jacket pocket, a belt holster, a briefcase, or a purse. These handheld electronic devices may incorporate a number of output devices (such as, for instance, a speaker, a display, an LED, and a vibrating mechanism) to notify a user of an incoming communication (e.g., telephone call, email, instant message, etc.).

Oftentimes, however, the user receives, and is notified of, an incoming communication at an inopportune time. For example, the user may receive a telephone call while attending a meeting. Although desiring to do so, the user may be unable to immediately answer and respond to the incoming call. Accordingly, the person placing the call may be redirected to the user's voice mail system which provides a general voice mail message as a response. In some instances, it may be important that the caller have immediate confirmation that the user received the call. However, a caller who decides to leave a message within the user's voice mailbox remains uncertain as to when, if at all, the user received the message.

It would be desirable to provide an improved handheld electronic device which is structured to operate in an improved fashion in response to an incoming message received by the handheld electronic device.

BRIEF DESCRIPTION OF THE DRAWINGS

A full understanding can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
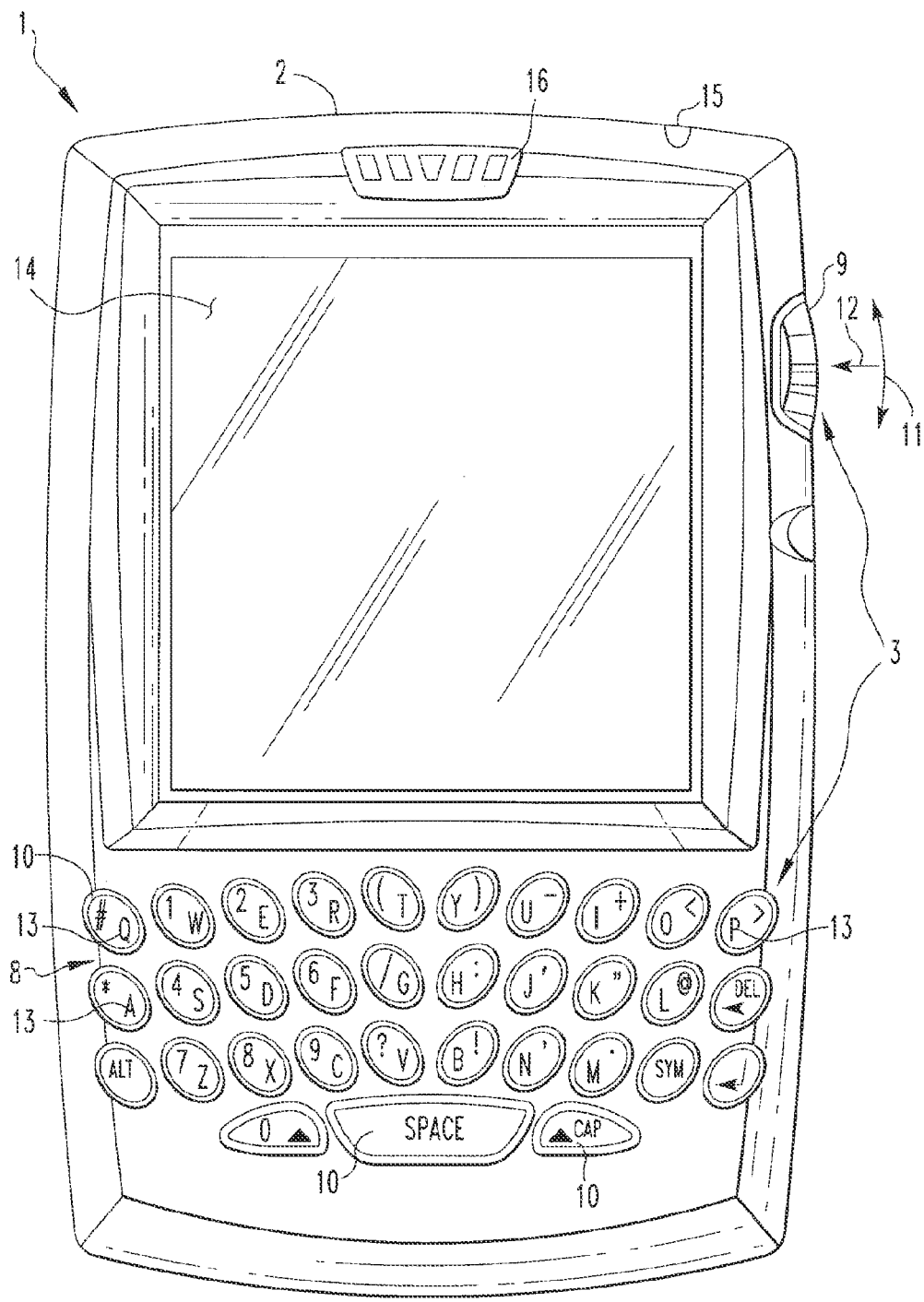
FIG. 1 is a top plan view of an improved handheld electronic device.
Figure 2:
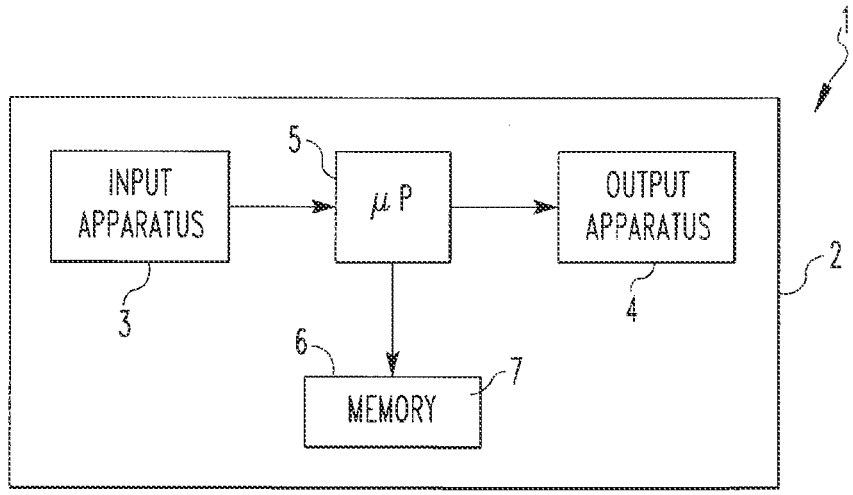
FIG. 2 is a schematic depiction of the handheld electronic device of FIG. 1.

An improved handheld electronic device 1 is indicated generally in FIG. 1 and is depicted schematically in FIG. 2. The exemplary handheld electronic device 1 includes a housing 2 upon which is disposed a processor unit that includes an input apparatus 3, an output apparatus 4, a processor 5, and a memory 6 for storing at least a first routine 7. The processor 5 may be, for instance, and without limitation, a microprocessor (μP) and is responsive to input signals from the inpu 1 apparatus 3 and provides output signals to the output apparatus 4. The processor 5 also interfaces with the memory 6 and is capable of executing at least a first routine 7. Examples of handheld electronic devices are included in U.S. Pat. Nos. 6,452,588, 6,873,317, and 6,489,950, which are incorporated by reference herein.

As can be understood from FIG. 1, the output apparatus 4 includes a display 14, an LED 15, and a speaker 16, each of which may be responsive to one or more output signals from the processor 5. The input apparatus 3 includes a keypad 8 and a thumbwheel 9. The keypad 8 is in the exemplary form of a full QWERTY keyboard including a plurality of keys 10 that serve as input members. The keys 10 are disposed on a front face of the housing 2, and the thumbwheel 9 is disposed at a side of the housing 2. The thumbwheel 9 can serve as another input member and is both rotatable, as is indicated by the arrow 11, to provide input to the processor 5, and also can travel in a direction generally toward the housing 2, as is indicated by the arrow 12, to provide other input to the processor 5.

Many of the keys 10 include a number of linguistic elements 13 disposed thereon. As employed herein, the expression "a number of" and variations thereof shall refer broadly to any non-zero quantity, including a quantity of one. As can be seen in FIG. 1, one of the keys 10 of the keypad 8, for instances, includes as the linguistic elements 13 thereof the letter "Q" and the symbol "#". Generally speaking, when a key 10 is actuated, the handheld electronic device 1 is structured such that the processor 5 recognizes, as an input thereof, one of the number of linguistic elements 13 disposed on the actuated key 10. For example, when a user is composing a message and actuates the key having the letter "Q" and the symbol "#" disposed thereon, the processor 5 is structured to recognize that the user is attempting to insert either "Q" or "#" into the message.

The memory 6 can be any one or more of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 6 includes a number of routines depicted generally with the numeral 7 for the processing of data. The routines 7 can be in any of a variety of forms such as, without limitation, software, firmware, and the like. As will be explained in greater detail below, the routines 7 include a user-selectable response function as an application, as well as other routines.

Figure 3:
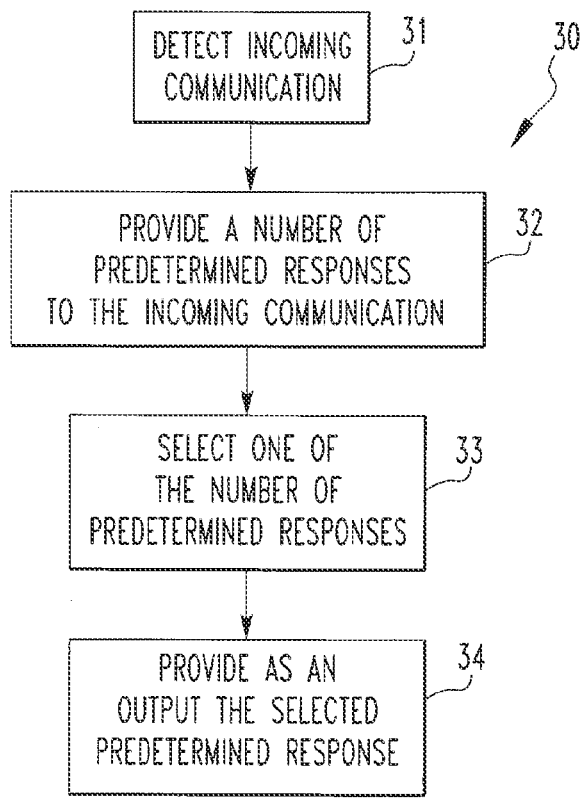
FIG. 3 is an exemplary flowchart depleting certain aspects of a user-selectable response function that can be executed on the handheld electronic device of FIG. 1.

An operational process 30 for implementing the user-selectable response function on the handheld electronic device 1 is illustrated in FIG. 3. Operational process 30 is initiated when the handheld electronic device 1 detects an incoming communication at operation 31. An incoming communication may include, for example and without limitation, a text-based message (e.g., email message; short message service (SMS) message, instant message (IM)) or a voice-based message (e.g., a telephone call) which is being received by the handheld electronic device 1. In the exemplary embodiment, the handheld electronic device 1 detects the sender and the format (e.g., text-based; voice-based) of the incoming communication.

After an incoming communication is detected in operation 31, a number-of predetermined responses to the incoming communication are provided for selection by the user at operation 32. For instance, representations of the predetermined responses may be output to display 14. In the exemplary embodiment, the predetermined responses may include general responses and/or responses that are specific to the sender of the incoming communication. If the handheld electronic device 1 detects that the user's spouse is calling, for example, the responses provided for selection by the user may include the general responses "Can't talk right now" and "Call you back in five minutes" as well as the specific responses "On my way to pick up the kids" and "I'll be home soon". In contrast, if the handheld electronic device 1 detects that the user's employer is calling, for example, the responses provided for selection by the user may include the general responses "Can't talk right now" and "Call you back in five minutes" as well as the specific responses "I'm in a meeting now", "I'm talking with a client now", and "I'll be back in the office soon".

Additionally, in the current embodiment, the user may associate multiple groups of predetermined responses with the same sender, with each group being associated with a particular format of the incoming communication. For example., as discussed above, the predetermined responses associated with a speech-based communication (i.e., a telephone call) from the user's spouse may include the general responses "Can't talk right now" and "Call you back in five minutes" as well as the specific responses "On my way to pick up the kids" and "I'll be home soon". However, the predetermined responses associated with a text-based communication (i.e., an email) from the user's spouse may include the general responses "Message received" and "I'll email yon back in five minutes" as well as the specific responses "Yes dear" and "No dear".

Once the predetermined responses are provided in operation 32, operational control passes to operation 33 where one of the predetermined responses is selected. In the exemplary embodiment, the predetermined responses provided in operation 32 (or representations thereof) are output to display 14 in a numbered list. The user may employ, for example and without limitation, the keys 10 or thumbwheel 9 to select the appropriate response. If, for example, the four predetermined responses which are discussed above as being associated with the user's spouse are output to display 14, the user may press the key 10 having the numeral "1" thereon to select response number "1" from the list (i.e., "Can't talk right now"), the key 10 having the numeral "2" thereon to select response number "2" from the list (i.e., "Call you back in five minutes"), the key 10 having the numeral "3" thereon to select response number "3" from the list (i.e., "On my way to pick up the kids"), or the key 10 having the numeral "4" thereon to select response number "4" from the list (i.e., "I'll be home soon"). Alternatively, the user may use the thumbwheel 9 to scroll (e.g., by rotating the thumbwheel 9 in a direction indicated by arrow 11) through the responses until the desired response is designated and then actuate the thumbwheel 9 (e.g., by causing the thumbwheel 9 to travel in the direction indicated by arrow 12) to select that designated response.

It should be noted that selection of one of the predetermined responses may be completed via other inputs. For example, and without limitation, display 14 may include touch screen functions such that actuation of display 14 (e.g., tapping a specific spot thereon) causes selection of one of the predetermined responses. Additionally, the handheld electronic device 1 may include a number of GPS enabled position sensors or other sensors which detect movement of the handheld electronic device 1. Accordingly, selection of one of the predetermined responses may be accomplished by moving the handheld electronic device up/down, forward/backward, and/or left/right (i.e., from one orientation and/or position to another orientation and/or position).

Once the predetermined response is selected in operation 33, operational control passes to operation 34 where the selected predetermined response is output to the sender. Although the predetermined responses are generally provided for selection by the user in text format on the display 14, the predetermined response selected by the user is output to the sender in a format (i.e., text-based, voiced-based, etc.) that is substantially the same as the incoming communication in the current embodiment. For example, if the incoming communication detected in operation 31 is an email message, the predetermined response selected by the user in operation 33 is output as an email message in operation 34. In contrast, if the incoming communication detected in operation 31 is speech-based (e.g., a telephone call), the predetermined response selected by the user in operation 33 is output in an audible, speech-based format (e.g., is a voice response) in operation 34.

In the current embodiment, the predetermined speech-based responses may be, for example and without limitation, a voice recording of the user or a text-based response that was converted to an audible, speech-based response. Likewise, the predetermined text-based responses may be, for example and without limitation, entered using the keypad 8 or converted from a recorded voice message.

The user-selectable response function of the present invention is structured to work in conjunction with the other functions of the handheld electronic device 1. For example, when the incoming communication detected in operation 31 is speech-based (e.g., a telephone call), in addition to providing a number of predetermined responses in operation 32, the user-selectable response function may also provide the user with the option of directing the incoming call into his/her voicemail system. Likewise, when the incoming communication detected in operation 31 is text-based (e.g., an email message), in addition to providing a number of predetermined responses in operation 32, the user-selectable response function may also provide the user with the option of directing the incoming call into his/her inbox without responding and/or the option of sending a message associated with, for example, the email program's out-of-office feature.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

The invention claimed is:

1. A method comprising:
   determining, at a processor of device, a sender of an incoming communication;
   providing, at an output apparatus of the device, a plurality of predetermined responses, at least some of the plurality of predetermined responses being specific to the sender;
   detecting, via a sensor of the device, a movement to select one of the plurality of predetermined responses as a selected predetermined response by performing at least one of: detecting a change in an orientation of the device and detecting a change in a position of the device; and,
   providing, at the output apparatus, the selected predetermined response as a response to the incoming communication.

2. The method of claim 1, further comprising providing at least a portion of the plurality of predetermined responses in a same format as the incoming communication.

3. The method of claim 1, wherein the incoming communication comprises an audible communication, and at least a portion of the predetermined responses provided at the output apparatus comprise respective representations of a plurality of predetermined audible responses.

4. The method of claim 1, wherein the sensor comprises one or more of a GPS (Global Positioning System) sensor and a position sensor.

5. The method of claim 1, further comprising detecting an actuation of an input device of the device to further determine the selected predetermined response.

6. The method of claim 5, wherein the input device comprises one or more of a key, a thumbwheel and a touch screen.

7. A device comprising:
   a processor, an output apparatus, and a sensor, the processor configured to:
   determine a sender of an incoming communication;
   provide, at the output apparatus, a plurality of predetermined responses, at least some of the plurality of predetermined responses being specific to the sender;
   detect, via the sensor, a movement to select one of the plurality of predetermined responses as a selected predetermined response by at least one of: detecting a change in an orientation of the device and detecting a change in a position of the device; and,
   provide, at the output apparatus, the selected predetermined response as a response to the incoming communication.

8. The device of claim 7, wherein the processor is further configured to provide at least a portion of the plurality of predetermined responses in a same format as the incoming communication.

9. The device of claim 7, wherein the incoming communication comprises an audible communication, and at least a portion of the predetermined responses provided at the output apparatus comprise respective representations of a plurality of predetermined audible responses.

10. The device of claim 7, wherein the sensor comprises one or more of a GPS sensor and a position sensor.

11. The device of claim 7, further comprising an input device, and wherein the processor is further configured to detect an actuation of the input device to further determine the selected predetermined response.

12. The device of claim 11, wherein the input device comprises one or more of a key, a thumbwheel and a touch screen.

* * * * *